US008345259B2

(12) United States Patent
Parriaux et al.

(10) Patent No.: US 8,345,259 B2
(45) Date of Patent: Jan. 1, 2013

(54) CYLINDRICAL GRATING ROTATION SENSOR

(75) Inventors: Olivier Parriaux, Saint-Etienne (FR); Yves Jourlin, Saint-Etienne (FR); Nikolay Lyndin, Moscow (RU)

(73) Assignee: Sick Stegmann GmbH, Donaueschingen (DE)

( * ) Notice: Subject to any disclaimer, the term of this patent is extended or adjusted under 35 U.S.C. 154(b) by 432 days.

(21) Appl. No.: 12/659,781

(22) Filed: Mar. 22, 2010

(65) Prior Publication Data
US 2010/0245841 A1   Sep. 30, 2010

(30) Foreign Application Priority Data

Mar. 27, 2009   (EP) .................................... 09100204

(51) Int. Cl.
*G01B 11/02*   (2006.01)

(52) U.S. Cl. ........................................ 356/499; 356/521

(58) Field of Classification Search .................. 356/488, 356/494, 499, 521; 250/231.1, 231.13–231.17, 250/237 G
See application file for complete search history.

(56) References Cited

U.S. PATENT DOCUMENTS

| 3,770,970 | A | * | 11/1973 | Trump | ..................... 250/231.14 |
| 4,172,994 | A | | 10/1979 | Bergkvist | |
| 5,369,271 | A | | 11/1994 | Nyui | |
| 5,696,374 | A | | 12/1997 | Fukui et al. | |
| 7,358,865 | B2 | * | 4/2008 | Igaki et al. | ...................... 341/13 |
| 2001/0006421 | A1 | * | 7/2001 | Parriaux | ...................... 356/499 |
| 2005/0128107 | A1 | | 6/2005 | Tseng | |
| 2008/0100849 | A1 | * | 5/2008 | Chang et al. | .................. 356/521 |

FOREIGN PATENT DOCUMENTS

| DE | 38 36 703 C2 | 5/1990 |
| DE | 196 37 625 A1 | 3/1998 |
| EP | 0 589 477 B1 | 3/1994 |

* cited by examiner

*Primary Examiner* — Tarifur Chowdhury
*Assistant Examiner* — Michael P Lapage
(74) *Attorney, Agent, or Firm* — Nath, Goldberg & Meyer; Jerald L. Meyer; Stanley N. Protigal

(57) ABSTRACT

Disclosed is a Rotation sensor with a light source, a light detector, an internal part having a first lateral surface, which is globally cylindrical and convex, and an external part having a second lateral surface which is globally cylindrical and concave. The first and second lateral surfaces both have a same central axis defining a rotation axis for a relative rotation between the internal part and the external part the angle of which this rotation sensor can measure. A first grating is arranged at the first lateral surface with its grating lines parallel to the rotation axis, and a second grating is arranged at the second lateral surface with its grating lines parallel to said rotation axis.

14 Claims, 4 Drawing Sheets

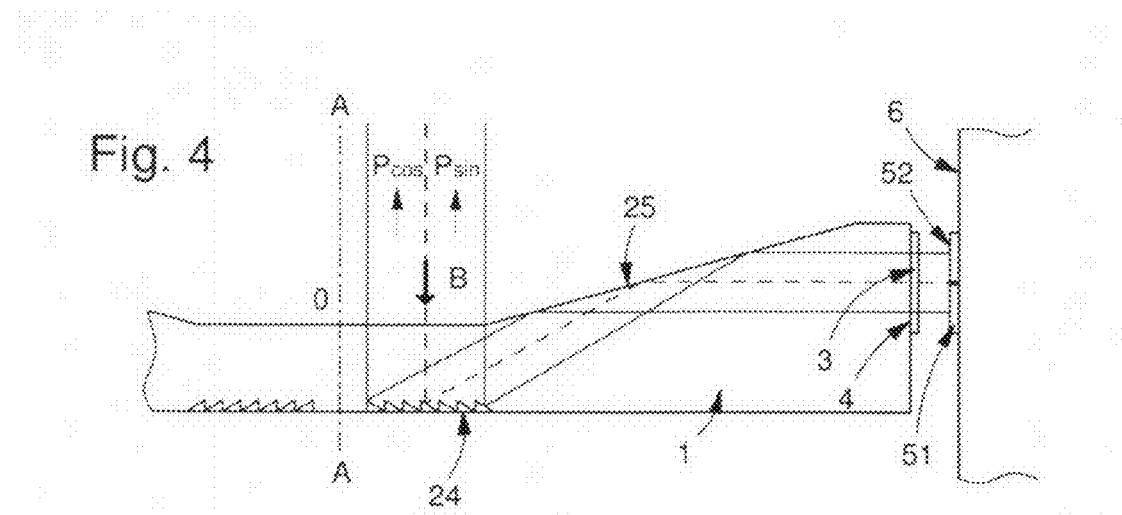
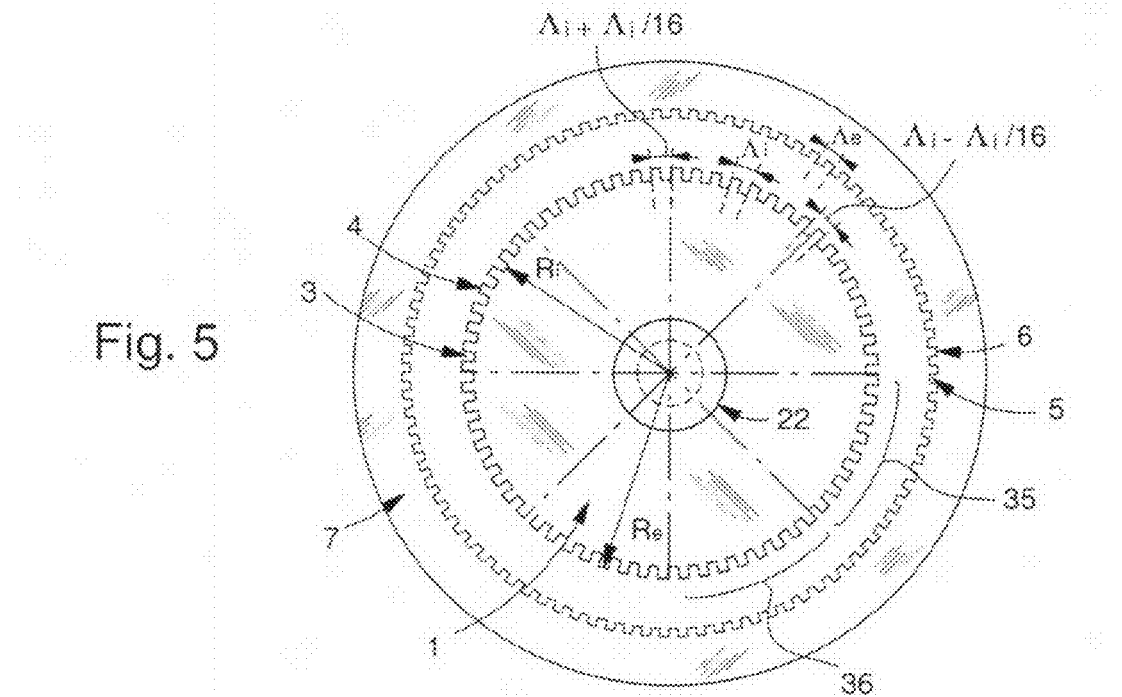
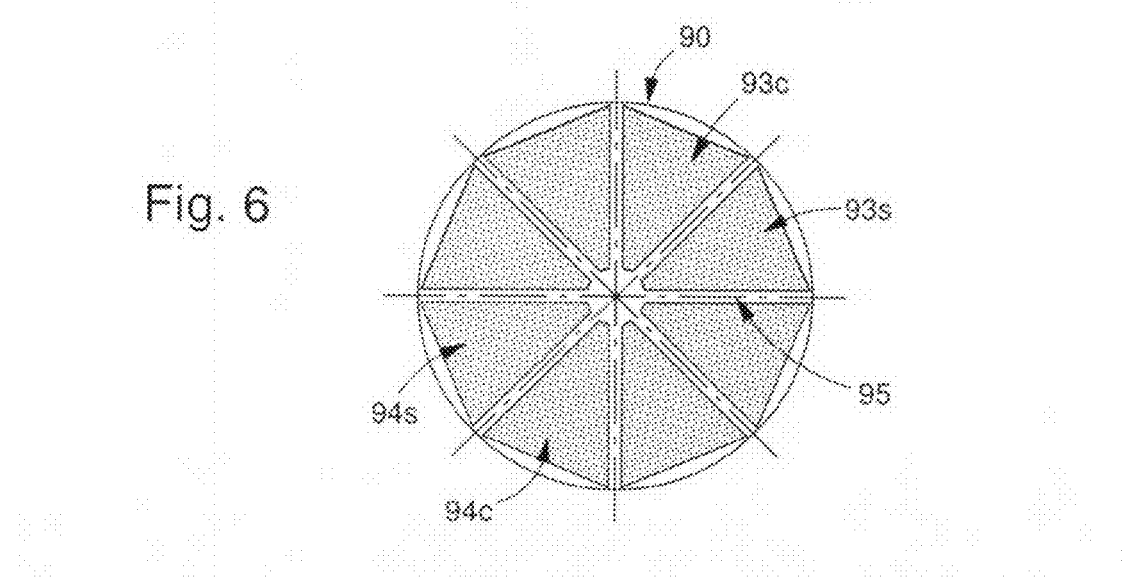

CYLINDRICAL GRATING ROTATION SENSOR

FIELD OF THE INVENTION

The high resolution optical measurement of rotation is usually made by means of a planar diffraction grating with radial lines defined at the surface of a rotating encoder disk on which the grating is arranged in the form of concentric rings of different periods or phases. Usually two diffraction orders diffracted in transmission or in reflection, directed along (for the $+1^{st}$ order) and opposite (for the $-1^{st}$ order) to the tangential displacement direction at the impact point of the incident beam, experience an optical phase-shift of opposite sign proportional to the local linear displacement, and are recombined by means of a second, non-rotating, radial planar grating which directs both phase-shifted diffracted beams in at least one common direction where they interfere.

BACKGROUND OF THE INVENTION

Two documents of the state of the art use the just described scheme and, in addition, aim at separating the effects of pure rotation from spurious effects of translation and eccentricity. A fully optical compensation solution was disclosed by Canon (EP 0 589 477). A number of micro-optical elements arranged above a standard rotating encoder disk forward the diffraction orders produced by a first diffraction event on the encoder disk ring to another diametrically opposed part of the encoder disk ring where they experience a second diffraction event, the grating diffraction order used in the first and second diffraction events having the same direction relative to the direction of rotation. This implies that a translation displacement tangential to the disk at the location of the two diffraction events does not give any signal since the twice diffracted beam experiences two phase-shifts of opposite sign. The proposed solution is however very bulky and the mounting of all spare optical elements results in very high fabrication and mounting costs.

A more monolithic solution was disclosed by Heidenhain (Winkelmesseinrichtung, DE 38 36 703) which integrates the light circulation scheme bringing the light beams from one diffraction event to a second diffraction event diametrically opposed on the encoder disk in a grating coupled planar waveguide defined on a planar substrate placed above the encoder disk. The proposed solution represents a progress relative to the prior art, but grating coupling in a waveguide is very sensitive to the parallelism between the disk and light circulation waveguide, and is highly sensitive to the wavelength of the laser source used which therefore must be wavelength stabilized. It is also sensitive to the spacing between the disk and the waveguide substrate and requires careful mounting, therefore mounting costs.

Both the described solutions of the state of the art suffer from the fact that the optical hardware for the light beam circulation scheme from one position of the radial grating disk to the other is somehow fixed to the non-rotating body of the rotation encoder, and that its position relative to the encoded grating track on the rotating disk varies with the occurrence of spurious translation effects and during rotation if there is eccentricity between the housing and the rotation axis and/or between the rotation axis and the radial grating track. This implies that translation effects are not exactly compensated, and that the interfered optical wave front picked up by a detector at the output of the double diffraction scheme exhibits fringes which may lead to contrast fading.

For the interference contrast to be close to one (1.0), the relative positioning of the two radial gratings must be precise and stable during relative rotation. The smaller the encoder disk, the more critical the relative centering conditions. This implies in particular that the length of the radial grating lines must be short if an acceptable contrast is to be preserved upon relative rotation in the presence of eccentricity due to imperfect alignment and mechanical shocks or vibrations; this in turn implies that the fraction of optical power impinging onto the encoder disk which experiences diffraction and interference decreases with a decrease of the encoder disk diameter. As the disk diameter reduces, as in micromotors for instance, the requirement of an optimal use of the available incident optical power and the requirement of high interference contrast become increasingly contradictory in sensors of the state of the art where the grating is formed at a planar surface of an encoder disk. Furthermore, in sensors of the state of the art which aim at compensating the spurious translation or eccentricity effects optically, as disclosed in the above mentioned documents, the translation effect which one intends to eliminate in the measurement does degrade the interference contrast, therefore does compromise the very first objective which is the measurement of rotation.

A rotation sensor using a cylindrical grating on a rotating rod is known from the document DE 196 37 625 A1 (entitled "Motor oder Generator mit zwei relativ zueinander beweglich gelagerten Teilen und einer Vorrichtung zum interferometrischen Messen eines Weges oder Drehwinkels"). This document discloses an external optical read head with two planar wave front shaping gratings for the measurement of the rotation of a reflection grating or hologram written directly on the cylindrical wall of a rotating rod or shaft. The rotation sensor has a light source generated a highly diverging beam which is then separated into two converging beams by the two planar wave front shaping gratings. These two converging beams are then incident on a same spot of the cylindrical grating where they experience a diffraction in a same output direction before reaching a light detector arranged between said two planar gratings. Chi-Tang Hsieh and Chih-Kung Lee, in "Cylindrical-type nanometer-resolution laser diffractive optical encoder", Applied Optics, Vol. 38, 1999, pp. 4743-4750, disclose an external complex read head with two sets of modified telescopes and wave front shaping means formed by several optical elements to compensate for radial-grating-induced wave front aberration. The only grating in this system is a cylindrical grating arranged at the lateral surface of a rotating disk. The several optical elements are precisely arranged so that two diffraction events occur successively on the single cylindrical grating. Both designs adapt the Cartesian geometry of a standard translation sensor read head to the symmetry of a rotating circularly symmetrical body which results in a complex optical system and cumbersome optical hardware. Further, both rotation sensors are very sensitive to any displacement of their optical elements, in particular to spurious translations or small rotations of these optical elements and to eccentricity of the rotating disk or rod.

U.S. Pat. No. 5,696,374 discloses an optical encoder for a linear position measuring system with the features of the preamble of claim 1.

SUMMARY OF THE INVENTION

The aim of the present invention is to propose an accurate optical grating rotation sensor which can be easily mounted and which is relatively little sensitive to eccentricity of the rotating part and to spurious translations or vibrations of this rotating part relative to another part of a device equipped with this rotation sensor. Further, an object of the present invention is to provide such a rotation sensor which can easily be used with very small units such as micro-motors.

To that end, the present invention concerns a rotation sensor comprising:
- a light source,
- a light detector,
- an internal part having a first lateral surface which is globally cylindrical and convex,
- an external part having a second lateral surface which is globally cylindrical and concave, said first and second lateral surfaces both having a same central axis defining a rotation axis for a relative rotation between said internal part and said external part the angle of which this rotation sensor can measure,
- at least a first grating arranged at said first lateral surface with its grating lines parallel to said rotation axis, and
- at least a second grating arranged at said second lateral surface with its grating lines parallel to said rotation axis;

the internal and external parts being arranged so that said first grating and said second grating are facing each other, one of said first and second gratings diffracting light in transmission and the other one diffracting light in reflexion, this rotation sensor being arranged so that the light provided by the light source is first incident on the grating diffracting it in transmission where this light is diffracted into first and second diffraction orders (first diffraction event), then this light diffracted into said first and second diffraction orders is incident on the other grating diffracting said light in reflexion respectively into third and fourth diffraction orders (second diffraction event) and finally the light diffracted back into said third and fourth diffraction orders is incident on said grating diffracting it in transmission where these third and fourth diffraction orders are respectively diffracted again and recombined so as to form a recombined light (third diffraction event), the periods of said first and second gratings as well as the diffraction orders in said first, second and third diffraction events being selected so that two light rays originating from a same first point in said first diffraction event and respectively propagating along first and second directions and then, after said second diffraction event, respectively along third and fourth directions are substantially incident on a same second point of the grating intervening in said third diffraction event where they recombine together in a common fifth direction and interfere, said rotation sensor being further arranged so that the recombined light propagating along said common fifth direction after said third diffraction event is finally at least partially incident on said light detector, the intensity variation of this recombined light being used to determine a relative angular rotation between said internal part and said external part.

The present invention permits to use most of the available incident light power without interference contrast fading due to shocks and eccentricity with high measurement resolution even in situations where the encoder disk is very small. In a preferred variant, the present invention makes a full use of the circularly cylindrical symmetry of the rotation of a circular body by using cylindrical waves. In a preferred embodiment, it also permits to separate the effect of rotation from the effects due to spurious translations, to measure the sole rotation, and also if needed to characterize the spurious translation.

Thus, in a first preferred embodiment, the rotation sensor of the present invention here-above disclosed is further characterized in that said first and second diffraction orders are respectively the $+1^{st}$ and $-1^{st}$ transmission orders and said third and fourth diffraction orders are both the $-1^{st}$ reflection order in the Littrow condition, so that said third and fourth directions are respectively identical to said first and second direction and so that the incident light in the first diffraction event and the recombined light in the third diffraction event are superimposed.

In another preferred embodiment, the rotation sensor of the present invention here-above disclosed is characterized in that this rotation sensor further comprises coupling means deviating light coming from the light source in a plane substantially normal to said rotation axis before said first diffraction event, the coupling means being arranged for reflecting an incident beam provided by the light source radially in said plane so that cylindrical waves impinge on the grating in said first diffraction event, the central axis of these cylindrical waves being aligned on the rotation axis. In a preferred variant, said incident beam is centered on the rotation axis before impinging on the coupling means, said cylindrical waves extending over the whole $2\pi$ angular width so as to form a light disk or light ring.

In a further preferred embodiment, the rotation sensor of the present invention here-above disclosed is characterized in that the light detector is attached to one of the first and second gratings, this one grating having at least two portions diametrically opposed relative to the rotation axis and the other grating being a cylindrical grating extending over the whole $2\pi$ angular width, the light detector having at least two distinct segments arranged so as to receive recombined light respectively diffracted by said at least two diametrically opposed grating portions. In a preferred variant, said first and second gratings are both cylindrical gratings extending over the whole $2\pi$ angular width, said light detector having at least two distinct segments arranged so as to receive recombined light respectively diffracted by said first and second gratings in two zones diametrically opposed relative to the rotation axis. In a further preferred variant, said light detector has a plurality of angular segments defining a plurality of pairs of opposite segments, each opposite segments pair receiving recombined light diffracted by the first and second gratings in two zones diametrically opposed relative to the rotation axis, two first diametrically opposed zones, corresponding to any first pair of opposite segments of the light detector, being angularly shifted relative to two second diametrically opposed zones corresponding to any other pair of opposite segments of the light detector. The number of said pairs of opposite segments is in particular greater than three.

In a further preferred embodiment, the rotation sensor of the present invention here-above disclosed is characterized in that it further comprises a third grating arranged at said first or second lateral surface with its grating lines parallel to said rotation axis, this third grating being phase-shifted relative to the other grating, among said first and second gratings, arranged at the same first or second lateral surface, the light detector having different segments for receiving recombined light diffracted by the third grating and recombined light diffracted by the other grating arranged at the same first or second lateral surface.

In a variant of the last mentioned preferred embodiment, said third grating and said other grating arranged at the same first or second lateral surface are arranged one above the other, the light detector having two adjacent annular regions for receiving recombined light respectively diffracted by said third grating and said other grating. In another specific variant, said third grating and said other grating arranged at the same first or second lateral surface are respectively formed by two sets of grating segments at a same level, the grating segments of one set being interleaved between the grating segments of the other set, two diametrically opposed grating segments belonging to a same set among said two sets.

Unlike in high resolution diffractive interferometric sensors having a planar grating defined at the surface of the encoder disk in a plane orthogonal to the rotation axis, the interference conditions between the orders produced by the cylindrical gratings of the present invention in relative rotation are only little sensitive to eccentricity effects. The cylindrical symmetry of the light and of the two gratings guarantees a natural coincidence and overlap between the interfering wave fronts without resorting to wave front shaping elements, therefore a high contrast interference over the whole wave front; this implies that close to all the available incident optical power participates in the interference process.

The rotation sensor of the present invention has a translation symmetry along the rotation axis and the interference condition between the wave fronts is independent of the axial coordinate, unlike in state of the art devices having the gratings in planes parallel to the encoder disk surface, and is little dependent on spurious eccentricity and translational effects.

An axial position of the interfered return beam permits to concentrate all information generated at the outskirt of the encoder plate onto a small area detector array. Further, the light source of the rotation sensor of the present invention needs not be of high temporal coherence.

The rotation sensor of the present invention can be applied to high resolution encoder disks of very small diameter receiving an incident beam of comparable diameter. In this case the light source can simply be a collimated LED.

Several cylindrical grating tracks of different periods or different relative phase offsets can be defined on the same cylindrical surface for obtaining an absolute encoding scheme, or a reference mark, or non-degenerate incremental functions of the rotation signal.

BRIEF DESCRIPTION OF THE FIGURES

The present invention will be further described in the following detailed description of non limitative examples, this description being made with reference to the annexed drawings in which:

FIG. 4 is the partial cross-sectional view of another embodiment of the rotation sensor according to the present invention;

FIG. 5 is a top view of a rotation sensor with a single segmented grating track according to a second preferred embodiment of the invention;

FIG. 6 is a view of the light detector of the second preferred embodiment allowing to efficiently compensate spurious translation effects;

DETAILED DESCRIPTION OF THE ILLUSTRATIVE EMBODIMENTS

Figure 1:
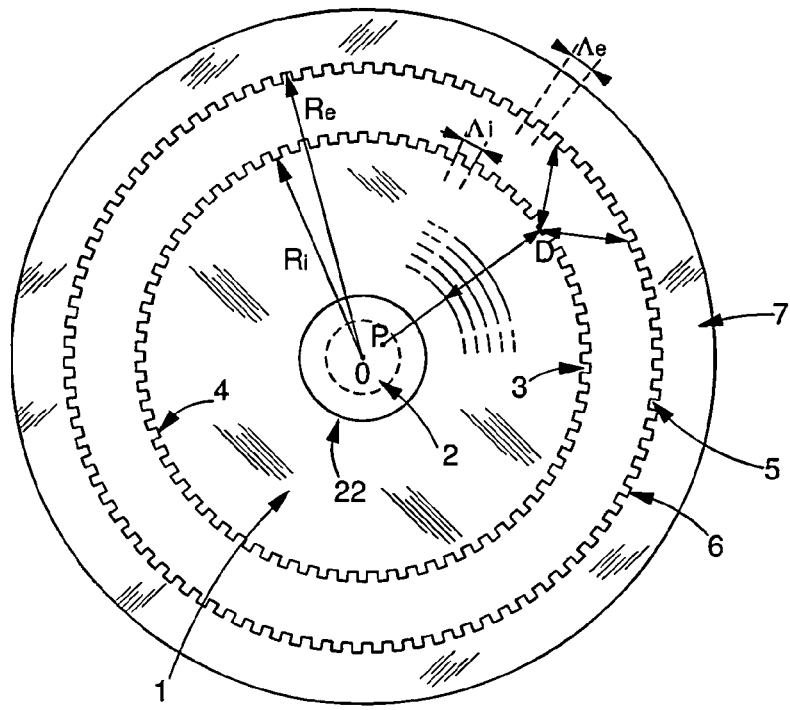
FIG. 1 is a top view of a rotation sensor according to a first preferred embodiment of the invention.
Figure 3:
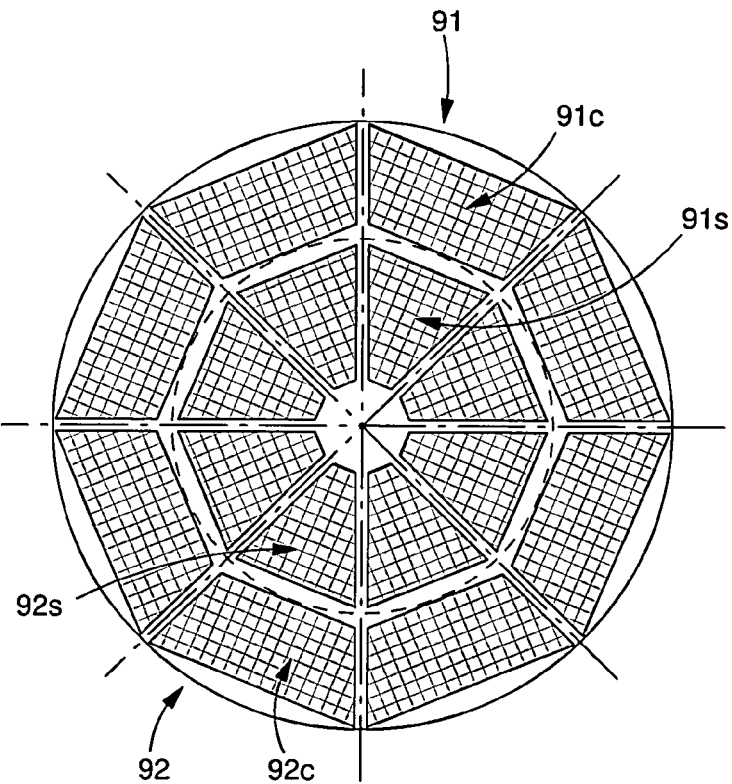
FIG. 3 is a view of the light detector of the first preferred embodiment allowing to efficiently compensate spurious translation effects.

FIGS. 1 to 3 show a first preferred embodiment of the present invention. A transparent encoder disk 1 defines an internal part of the device. This disk has a center O, a radius R and a refractive index $n_s$ and comprises coupling means 2 in the form of an embedded reflective cone 22. This disk further comprises at its lateral surface or disk wall 4, which is globally cylindrical and convex, a corrugation grating 3 of preferably binary rectangular groove profile with grating lines parallel to the rotation axis A. The plane surfaces of the disk 1 are normal to the axis A. The period $\Lambda_i$ of grating 3 is $\Lambda_i = R_i \Lambda_\phi$, where $\Lambda_\phi$ is the angular period in radians.

A normally incident light beam or ray B provided by a light source 10 impinges at point P onto the surface of cone 22, having an angle of substantially 45 degrees relative to axis A, and is reflected radially in a plane essentially normal to rotation axis A within the transparent encoder disk 1. At point D on the encoder disk wall 4 the beam B experiences a first diffraction event where it is diffracted into the $+1^{st}$ and $-1^{st}$ transmission orders. From point D, these two diffracted orders respectively propagate along first and second directions towards a reflection grating 5. These two diffracted $+1^{st}$ and $-1^{st}$ transmission orders then impinge on this reflection grating of period $\Lambda_e = \Lambda_i R_e/(2R_i)$ arranged at the globally cylindrical and concave lateral surface or wall 6 of radius $R_s$ of a substrate 7, defining an external part of the device, where they experience a second diffraction event. In the present case, they both ensure $-1^{st}$ reflection order in the Littrow condition. The reflection grating 5 has also grating lines substantially parallel to the rotation axis A and its angular period is $\Lambda_\phi/2$.

The condition $\Lambda_e = \Lambda_i R_e/(2R_i)$ ensures that the incidence of the $+1^{st}$ and $-1^{st}$ orders diffracted by grating 3 is always the $-1^{st}$ order Littrow incidence on grating 5 whatever $R_i$ and $R_e$. This is an advantage of this preferred embodiment of the invention. If the radial spacing between the two gratings is much smaller than $R_i$, the period $\Lambda_e$ of grating 5 is close to half the period $\Lambda_i$ of grating 3. Thus, said two diffracted $+1^{st}$ and $-1^{st}$ transmission orders respectively propagating along said first and second directions come back after the second diffraction event respectively along third and fourth directions which, in the present case, respectively correspond to the first and second directions. Further, they are incident again on grating 3, both at point D, where they experience a third diffraction event for recombining together in a fifth common direction so as to interfere. In the present case, the recombined light propagates back in the transparent disk towards the cone 22.

It is to be noted that a single beam or ray is sketched between P and D in FIG. 1 for sake of simplicity. In a first variant, beam B (represented in FIGS. 2A and 2B) is first a collimated beam centered on the rotation axis A. In another variant, beam B is still centered on axis A but its transverse energy profile defines a light ring. After reflection by the cone 22, the "beam" propagating in the disk is actually a light sheet or light disk filling the whole transparent encoder disk with a given thickness. The incident light is thus diffracted by the two gratings 3 and 5 uniformly over $2\pi$. The coupling means 2 reflects an incident collimated light beam in the transparent disk where this light propagates in form of cylindrical waves with a central axis aligned on the rotation axis A. Thus the light incident on grating 3 presents the same cylindrical symmetry as this grating.

It is assumed here that the substrate 7 is attached to a fixed part of the mechanical system and that the disk 1 is attached to the mobile part. However, the roles can be swapped as it is the relative rotation which is measured. After $-1^{st}$ order reflection on grating 5 (second diffraction event) the two beams recombine at point D on grating 3 where they are diffracted into a number of diffraction orders into the disk 1

(third diffraction event). In particular, the respective $+1^{st}$ and $-1^{st}$ transmission orders of grating 3 recombine radially and interfere. A recombined light beam or ray coming back from point D of grating 3 impinges at point P on the cone 22. Thus, the incident light in said first diffraction event and the recombined light in said third diffraction event are superimposed.

The interfered optical power propagated by the return light in the transparent disk is a function of the relative phase between the two diffracted beams. As the optical path of two diffracted beams between the two gratings 3 and 5 is identical, the optical phase difference $\Delta\Phi$ between them is only caused be the relative displacement between gratings 3 and 5, i.e. is a function of the relative rotation between the internal part and the external part. This optical phase difference is given as $\Delta\Phi = 2K_e R_e \Delta\phi = 4K_i R_i \Delta\phi$ where $K_e$ and $K_i$ are the respective modules of the azimuthal k-vectors of grating 5 and 3 ($K_e = 2\pi/\Lambda_e$ and $K_i = 2\pi/\Lambda_i$) and $\Delta\phi$ is the relative angular rotation in radians between the two gratings 3 and 5.

Figure 2A:
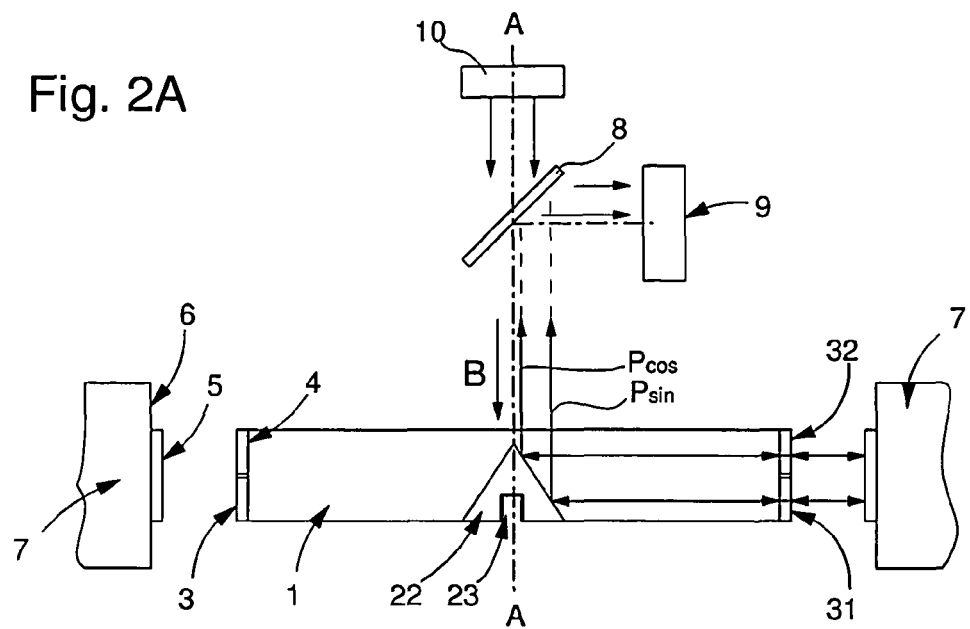
FIG. 2A is a cross-sectional view of the rotation sensor of FIG. 1.
Figure 2B:
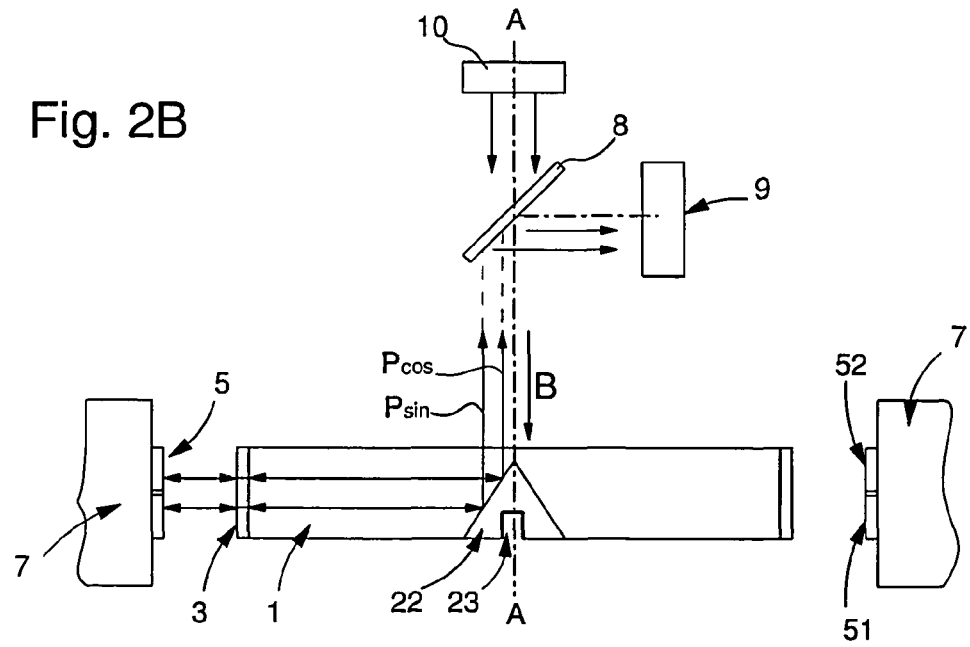
FIG. 2B is a cross-sectional view of a variant of the rotation sensor of FIG. 1.

The optical power $P_{cos}$ of the recombined diffraction orders, as represented in FIGS. 2A and 2B, is proportional to the square modulus of the recombined field $\exp(j\Delta\Phi/2) + \exp(-j\Delta\Phi/2)$, thus proportional to $(1+\cos(\Delta\Phi))/2$. For determining the direction of relative rotation it is advantageous to define grating 3 in the form of two subgratings 31 and 32 side by side on the lateral surface or wall 4 (see variant of FIG. 2A) having exactly the same period $\Lambda_i$, but azimuthally shifted by a displacement $\delta\Lambda_i$ so that the second subgrating delivers a recombined power signal $P_{sin}$ phase shifted by $\pi/2$ relative to $P_{cos}$, $P_{sin}$ being proportional to $(1+\sin(\Delta\Lambda))/2$. The relative shift between the two subgratings 31 and 32 on cylindrical wall 4, giving the two quadrature power signals $P_{cos}$ and $P_{sin}$, is $\delta\Lambda_i = \Lambda_i/16$.

As represented in the variant of FIG. 2B, the two shifted subgratings 51 and 52 can also be defined by the reflection grating 5; in this case the relative shift $\delta\Lambda_e$ is $\delta\Lambda_e = \Lambda_e/8$ for obtaining the two quadrature power signals $P_{cos}$ and $P_{sin}$. It may be advantageous to define three shifted subgratings with 120 degree electrical phase shift instead of two subgratings with 90 degree phase shift.

The interfered wave returning from the mixing diffraction event (third diffraction event) at grating 3 is composed of at least two superposed light sheets of phase shifted optical power. These will be redirected normally by the cone 22 and trans-formed into a central collimated light beam corresponding to the upper light sheet and a light ring corresponding to the lower light sheet. A beam splitter 8 directs the normal return beam to a light detector 9 formed by a pixels array. The light detector 9 shown in FIG. 3 preferably adopts the cylindrical symmetry of the device in that it comprises a number of pixels organized in angular segments and rings, thus permitting the separate measurement of azimuthally and radially resolved optical power components. The cylindrical symmetry with return beam on the rotation axis permits to use a single and small opto-ASIC capable of detecting all needed information on the relative movement of the two gratings 3 and 5. This is an important advantage of the first preferred embodiment. The detection of the recombined light by a plurality of angular segments defining a plurality of diametrically opposed segments relative to the center of the array corresponding to the central axis of the collimated recombined light beam after reflection by the cone 22 is especially important in the presence of eccentricity and at the occurrence of spurious translations due to shocks. This is a further important advantage of the present invention. A pair of opposite segments receive light coming from two diametrically opposed portions of grating 3, i.e. light being diffracted by the gratings 3 and 5 in two diametrically opposed zones of the device relative to the rotation axis A.

Unlike in high resolution rotation sensors of the state of the art having the gratings defined in planes orthogonal to the rotation axis, the occurrence of eccentricity and spurious translations in the present device does not lead to a catastrophic fading of the interference contrast, what is also a further important advantage of the present invention, but it nevertheless still leads to rotation measurement errors. These are determined and compensated for by simultaneously measuring the optical power of diametrically opposed angular segments which "see" the same displacement direction due to rotation, but that due to translation with opposite sign.

The circle on cone 22 in FIG. 1 indicates the separation between the sine and cosine light sheets defined in FIGS. 2A and 2B. The segmentation of the light detector is made either electrically in a detector array with a Cartesian arrangement of pixels, or optically by a dedicated geometrical layout of the detecting areas, while the disk 1 remains azimuthally uniform and does not bear any trace of the segments. A good stability between disk 1, beam splitter 8 and segmented detector array 9 is achieved if the external grating 5 and its substrate 7 belong to the mobile part of the device.

The procedure permitting to eliminate the effect of spurious translational and eccentricity errors on the measurement of rotation will now be described. A spurious translation of amplitude $\Delta s$ of the external grating 5 is assumed to take place in the direction orthogonal to $\psi_0$, $\psi_0$ being defined relative to the origin of the angular coordinate of the cylindrical coordinate system. An eccentricity is defined as a non-coincidence of the centers of gratings 3 and 5. The presence of an eccentricity amounts to a time independent translation between the two gratings. The spurious relative translation of grating 5 causes a phase shift in the power interference product between the two diffraction orders reflected by grating 5 to grating 3. This power phase shift is not "seen" identically at all points of grating 3: it is maximum, and equal to $2K_e\Delta s$, at the point of grating 3 having the angular coordinate $\psi=\psi_0$, and it is zero at the point of grating 3 having the angular coordinate $\psi=\psi_0+\pi/2$ since there is no tangential relative displacement between the two gratings 3 and 5. Therefore, the spurious phase shift generated at any point of grating 3 located at the azimuthal abscissa $\psi$ is $2K_e\Delta s \cos(\psi-\psi_0)$. Considering two signals in quadrature $P_{cos}(\Delta\phi, \Delta s, \psi-\psi_0)$ and $P_{sin}(\Delta\phi, \Delta s, \psi-\psi_0)$ where $\Delta\phi$ is the relative angular position in radians between gratings 3 and 5 to be measured, $\Delta s$ is the spurious translation in length unit oriented normally to a diameter set at $\psi_0$ in the cylindrical coordinate system attached to O, the power signals in one angular segment 91 of angular coordinate $\psi$ are proportional to $$P_{cos} \alpha 1 + \cos(2K_e R_e \Delta\phi - 2K_e \Delta s \cos(\psi-\psi_0))$$

$$P_{sin} \alpha 1 + \sin(2K_e R_e \Delta\phi - 2K_e \Delta s \cos(\psi-\psi_0))$$

where the sign. "a" means "proportional",
and in the diametrically opposite angular segment 92:

$$P_{cos} \alpha 1 + \cos(2K_e R_e \Delta\phi + 2K_e \Delta s \cos(\psi-\psi_0))$$

$$P_{sin} \alpha 1 + \sin(2K_e R_e \Delta\phi + 2K_e \Delta s \cos(\psi-\psi_0))$$

The diametrically opposite, translation compensating angular segments 91 and 92 each comprise two fields: fields 91c and 92c detect the cosine signals, fields 91s and 92s detect the sine signals. The two power signal components $P_{cos}$ and $P_{sin}$ detected in segment 91 and the two power signals detected in segment 92 permit to retrieve the phase $\Xi_{91}=2K_e R_e \Delta\phi - 2K_e \Delta s \cos(\psi-\psi_0)$ and $\Xi_{92}=2K_e R_e \Delta\phi + 2K_e \Delta s \cos(\psi-\psi_0)$ of the power signals in segments 91 and 92 respectively.

Adding the phases $\Xi_{91}$ and $\Xi_{92}$ measured diametrically opposite permits to retrieve twice the rotation phase shift $2K_e R_e \Delta\phi$ and also, if needed, subtracting $\Xi_{91}$ and $\Xi_{92}$ in each pair of opposite segments permits to fully determine the spurious relative displacement characterized by $\Delta s$ and $\psi_0$. Such signal processing permits to fully characterize the mechanical imperfections in addition to providing the essential information on the sole rotation. The number of pairs of opposite segments is preferably equal or superior to 4 in order to prevent a possible contrast fading due to a too large translation amplitude $\Delta s$ (see next paragraph) and so as to permit the determination of the spurious translation effects. In practice, the angular segments have a finite angular width and are angularly centered at azimuthal abscissa $\psi$. The exact dependence of $P_{cos}$ and $P_{sin}$ on $\psi$ in an angular segment results from an integration of the expressions of $P_{cos}$ and $P_{sin}$ given above along $\psi$ over the angular width of the segment. The algebraic derivation of such integral is given hereunder. However, if the angular width of the segments is small, for instance 30 degrees and less, the above expressions for $P_{cos}$ and $P_{sin}$ represent a good approximation for the $\psi$ dependence.

There is more that can possibly be done by measuring the total power falling onto the detector array and making an integrated measurement. Rewriting $P_{cos}$ and $P_{sin}$ as $P_{cos} \alpha 1+\sin(2K_e R_e \Delta\phi)\sin(2K_e \Delta s \cos(\psi-\psi_0))+\cos(2K_e R_e \Delta\phi)\cos(2K_e \Delta s \cos(\psi-\psi_0))$ $P_{sin} \alpha 1+\cos(2K_e R_e \Delta\phi)\sin(2K_e \Delta s \cos(\psi-\psi_0))+\sin(2K_e R_e \Delta\phi)\cos(2K_e \Delta s \cos(\psi-\psi_0))$ and integrating along $\psi$ over $2\pi$ yields the integrated $P_{cos}$ power $\Pi_{cos}$ and the integrated $P_{sin}$ power $\Pi_{sin}$ proportional to the following mathematical functions:

$\Pi_{cos} \alpha 1+J_0(2K_e \Delta s)\cos(2K_e R_e \Delta\phi)$ $\Pi_{sin} \alpha 1+J_0(2K_e \Delta s)\sin(2K_e R_e \Delta\phi)$ where $J_0$ is the Bessel function of order 0.

Furthermore, subtracting and adding both integrated power expressions yield useful expressions:

$\Pi_{sin}-\Pi_{cos} \alpha J_0(2K_e \Delta s)(\sin(2K_e R_e \Delta\phi)-\cos(2K_e R_e \Delta\phi))=(2)^{1/2} J_0(2K_e \Delta s)\sin(2K_e R_e \Delta\phi-\pi/4))$.

$\Pi_{sin}+\Pi_{cos} \alpha 2+-J_0(2K_e \Delta s)(\sin(2K_e R_e \Delta\phi)+\cos(2K_e R_e \Delta\phi))=2+(2)^{1/2} J_0(2K_e \Delta s)\cos(2K_e R_e \Delta\phi-\pi/4))$.

Integrated measurement and separation of the translational and rotational effects is thus possible since the rotation and the spurious translation have separate and definite functional dependences. A preferred use of the integrated measurement is in cases where the translational effects are limited by a high quality mechanics which guarantees that the argument $2K_e \Delta s$ is notably smaller than the first zero of Bessel function $J_0$ at $2K_e \Delta s=2.405$ in order to avoid the fading of the useful rotation signal. As an example, assuming an external grating 5 of 1 micrometer period, thus a grating k-vector of $K_e=6.28$ $\mu m^{-1}$, the translation amplitude $\Delta s$ permitting an integrated detection free from fading must be notably smaller than 0.2 $\mu m$ which places very critical demands on the mechanics or requires a further inventive step.

The incidence configuration in FIGS. 2A and 2B where the incident beam illuminates the whole disk circularly and symmetrically requires preferably an incident beam of radial or azimuthal polarization. An azimuthal polarization distribution is preferred because it imposes the TM polarization on the reflective grating 5 under the $-1^{st}$ order Littrow condition which is known to give rise to close to 100% diffraction efficiency with shallow grooves. In the case of a large encoder disk the normally incident beam can impinge on the coupling means 2 slightly off the axis A and give rise to a reflected beam in the encoder disk 1 which fills with light only an angular segment of the disk instead of $2\pi$. The concave reflection grating 5 can be of restricted size and just have the angular aperture of the measurement beam. In this case the polarization of the electric field of the input beam is simply linear and preferably parallel to the plane of the disk after reflection on the cone 22.

Cylindrical gratings 3 and 5 can be fabricated by injection molding or UV or hot embossing. Grating 3 is preferably binary with essentially rectangular grooves. Its period $\Lambda_i$ is at least larger than $\lambda/n_g$ in order to ensure that the $+1^{st}$ and $-1^{st}$ transmitted orders propagate in the space between the two gratings. This space can possibly be filled with a liquid of refractive index $n_g$. $\Lambda_i$ is preferably smaller than $3\lambda/n_g$ in order to prevent the diffraction of the $+3^{rd}$ and $-3^{rd}$ diffraction order. Grating 3 is therefore a wavelength scale grating for which the depth d and line/space ratio l/s must be optimized for maximum diffraction efficiency of the transmitted $+1^{st}$ and $-1^{st}$ orders; however, an adequate value for a start of the optimization is given by the scalar approximation $d=\lambda/(2(n_s-n_g))$. As an example, with $n_s=1.59$ (polycarbonate), $n_g=1$ (air), a red semiconductor laser ($\lambda=650$ nm), a period $\Lambda_i=1$ $\mu m$, the optimum depth d for maximum $+/-1^{st}$ order diffraction efficiency in air is about 650 nm for both polarizations (40% for TE and 45% for TM) and a l/s ratio of 50/50; the $0^{th}$ order transmission if 5% for the TM and 7% for the TE polarization. Grating 5 is preferably a metallized binary grating. Its period $\Lambda_e$ is close to half that of grating 3 if the spacing between gratings 3 and 5 is much smaller than their radius. In order to ease its fabrication by a replication technique it is preferable to use the TM incident polarization to give close to 100% diffraction efficiency under $-1^{st}$ order Littrow incidence with a rather shallow grating. Pursuing with the above example, assuming a disk radius of 12.5 mm, a gap between gratings 3 and 5 of 100 $\mu m$, the period $\Lambda_e$ is 504 nm. A simple line/space ratio of 50/50 and a grating depth of 140 nm with aluminum coating gives a diffraction efficiency of 86% whereas the $-1^{st}$ order efficiency of the TE polarization remains smaller than 20%.

The description of the first embodiment of the invention has been made with a metallic or metalized cone 22 as the coupling means 2. This cone is embedded into the substrate of the disk. The cone 22 preferably comprises in its basis means 23 for the fixing of the disk 1 to the rotating axis or shaft. The fixing means 23 can be a screw or a hole with thread or any other adequate fixing element.

In a variant, a more integrated planar coupling means is formed by a grating 24 of circular lines and grooves centered at O and by a conical mirror 25 as shown in FIG. 4. The grating grooves are blazed to favor the first diffraction order pointing to the outside of the disk if the incident beam is collimated. A simpler solution is to slightly focus the incident beam onto the center O so as to privilege the diffraction order pointing towards the outside of the disk. The circular grating 24 is preferably of the reflective type, defined at the face of disk 1 opposite to the incidence side. Such coupling grating can not efficiently direct the coupled light sheet in a direction strictly parallel to the surface of the disk 1. The wave coupled into, and trapped in the disk 1 propagates with an incidence angle significantly larger than the substrate/air critical angle. The top surface of disk 1 defines the conical mirror 25 to redirect the coupled light sheet in a direction normal to the rotation axis, so as to enable diffraction onto the two gratings 3 and 5 under the conditions described above. Such disk is easy to replicate by injection molding and embossing.

FIGS. 5 and 6 show a second preferred embodiment of the invention. Spurious translations are not the only effect of mounting errors between the fixed and rotating parts and of shocks. Another effect is the relative tilt between the axis of the mobile and fixed parts of the device. The effect of this tilt in the embodiment illustrated in FIGS. 1 to 4 is to induce a non-parallelism between the lines of gratings 3 and 5. This can lead to contrast fading and does lead to an alteration of the 90 degree phase shift between the sine and cosine tracks as the tracks 51 and 52 in FIGS. 2 and 4 are one above the other. In order to suppress the error on the quadrature condition, a single track embodiment illustrated in FIG. 5 is proposed. This device also takes advantage of the segmentation of the light detector array in angular segments, as represented on FIG. 6. Grating 5 is uniform and identical to that of the first embodiment. Grating 5 and its substrate 7 belong to the rotating part of the device. In this embodiment, the inner grating 3 is made of angular segments which are azimuthally translated: every two grating segment 35 is shifted by $\Lambda_i/16$ closer to its clockwise (or anticlockwise) neighbour 36. Grating 3 is thus composed of two sets of interleaved segments, one set being shifted by $\Lambda_i/16$ relative to the other set.

The segmentation of the grating on disk 1 is azimuthally aligned with the segmentation of the detector array 90 illustrated in FIG. 6. In this embodiment, the disk 1, beam splitter 8 and detector array 90 belong to the fixed part of the device. The detector array 90 is segmented into single field adjacent angular segments 93c, 93s detecting cosine and sine functions with the corresponding translation compensating segments located diametrically opposite 94s and 94c. In FIG. 5 the number of segments represented is intentionally restricted for sake of clarity of the drawing. In the actual device, the number of segments is larger in order to better resolve the translational effect. The total number of opposite segment pairs is preferably equal to, or larger than 8. Adjacent grating segments have a narrow dead zone without grating between them to prevent interferences between phase shifted power signals. This isolation can also be achieved by defining dead zones 95 on the detector array 90 between adjacent segments. Quadrature between two power signals is not the only single track scheme, 120 phase shifted power signals can also be obtained by means of 3 sets of interleaved segments.

Figure 7:
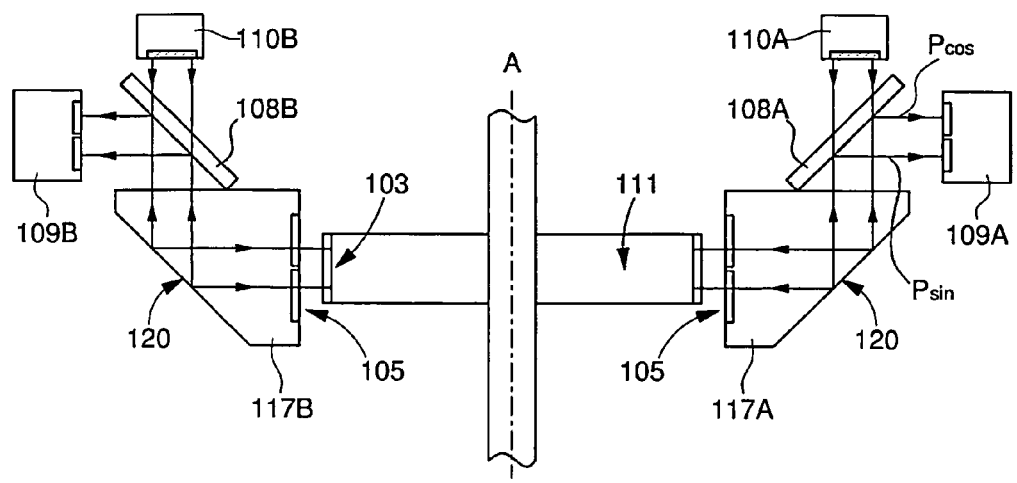
FIG. 7 is a schematic cross-sectional view of another embodiment of the present invention.
Figure 8:
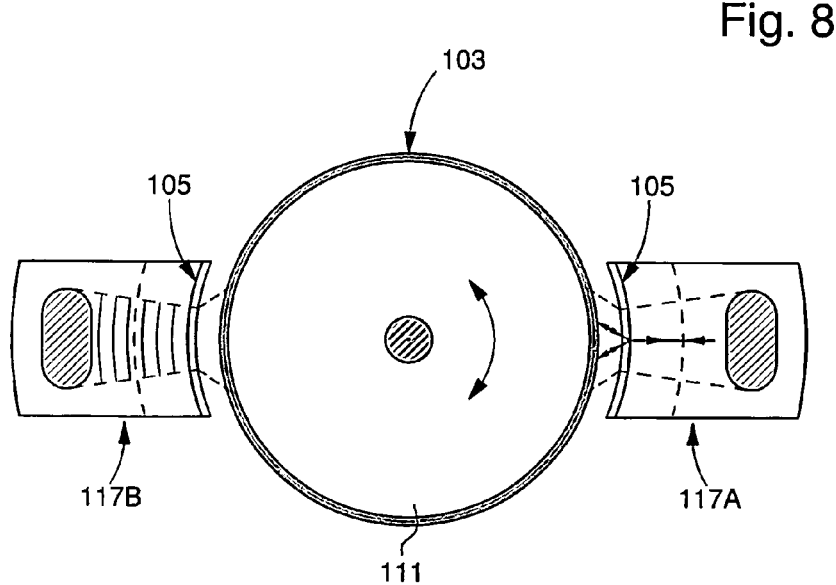
FIG. 8 is a partial top view of the rotation sensor of FIG. 7.

A further embodiment of the present invention is shown on FIGS. 7 and 8. This embodiment differs fundamentally from the other described embodiments by the fact that the grating 103 arranged at the lateral surface of the internal part 111 diffracts the light in reflection and the grating 105 arranged at the lateral surface of the external part, formed here by two elements 117A and 117B, diffracts the light in transmission. Thus, the light provided by the light source, formed in this given variant by two light emitting units 110A and 110B, first propagates in the transparent external elements 117A and 117B where it is deviated by an inverse conical mirror 120 in a plane substantially normal to the rotation axis A. In this plane, the light is formed by cylindrical waves of central axis aligned on the rotation axis converging towards the external grating diffracting said light into the $+1^{st}$ and $-1^{st}$ transmission orders. Then the light impinges onto the internal grating which diffracts the incident light propagating along said $+1^{st}$ and $-1^{st}$ transmission orders both into the $-1^{st}$ reflection order in the Littrow condition. Further, the two diffracted beams coming back experience a further diffraction event onto said external grating where they recombine in a common radial direction and interfere. The recombined light is reflected by the inverse conical mirror and then is directed on light detector units 109A and 109B via two beam splitters 108A and 108B respectively associated to the external elements 117A and 117B.

The light beam provided by each light emitting unit is collimated and extended in a tangential direction relative to the disk 111 in order to have the light extending in a sufficiently wide annular segment. For a small motor for example, the external part could be formed by a single annular piece extending over the whole $2\pi$ angle and thus defining an inverse conical mirror over the whole $2\pi$ angle centered on the rotation axis. The light source could be formed by a single unit with several emitting diodes arranged circularly above the annular piece or by a central unit associated with optical means extending the generated light beam by shaping an annular light ring propagating in direction of the inverse conical mirror of the external part. After reflection, the light forms a light ring defined by concentric cylindrical waves propagating in the direction of the external grating. The light detector could be formed by a ring with segmented zones arranged at the inner lateral wall of this ring. As in the other embodiments, one of the two gratings is formed by two phase-shifted sub-gratings and the light detector has separated segments for receiving the recombined light coming respectively from these two sub-gratings. It is to be noted that the position of the light source and the light detector could be inversed.

In this last embodiment, the internal disk could be replaced by a rod or a shaft of a rotating part. An advantage of this last embodiment is that the internal region is left free by the rotation sensor, so that a shaft can transverse the central region of such a rotation sensor.

The invention claimed is:

1. A rotation sensor, comprising
a light source,
a light detector,
an internal part,
an external part,
a first grating arranged on the internal part, and
a second grating arranged on the external part;
the internal and external parts configured such that the first grating and the second grating are facing each other and one of the first and second gratings diffracting a light provided by the light source in transmission and the other one diffracting the light in reflection,
wherein the rotation sensor is configured such that the light provided by the light source is first incident on the grating diffracting the light in transmission where the light is diffracted in a first diffraction event, then the light is incident on the grating diffracting the light in reflection respectively in a second diffraction event, and finally the light is incident on the grating diffracting the light in transmission where the light is respectively diffracted again and recombined so as to form a recombined light in a third diffraction event, the periods of the first and second gratings as well as the diffraction orders in the first, second and third diffraction events being selected such that two light rays originating from a same first point in the first diffraction event and respectively propagating along first and second directions and then, after the second diffraction event, respectively along third and fourth directions, are substantially incident on a same second point of the grating intervening in the third diffraction event where the two light rays form a recombined light in a common fifth direction and interfere, the rotation sensor further configured such that the recombined light propagating along the common fifth direction after the third diffraction event is finally at least partially incident on the light detector, the intensity variation of the recombined light being used to determine a relative movement between the internal part and the external part, wherein the internal part comprises a first lateral surface with the first grating which surface is globally cylindrical and convex, and the external part having a second lateral surface with the second grating which surface is globally cylindrical and concave, the first and second lateral surfaces both having a same central axis defining a rotation axis for a relative rotation between the internal part and the external part the angle of which the rotation sensor can measure by means of the intensity variation of the recombined light, and the first grating is arranged with grating lines parallel to the rotation axis, and the second grating is arranged with grating lines parallel to the rotation axis;

wherein the rotation sensor comprises coupling means deviating the light coming from the light source in a plane substantially normal to the rotation axis before the first diffraction event and the coupling means are arranged for reflecting the light radially in the plane so that cylindrical waves impinge on the first grating in the first diffraction event, the central axis of these cylindrical waves being aligned on the rotation axis.

2. The rotation sensor according to claim 1, wherein the first diffraction event comprises the $+1^{st}$ and $-1^{st}$ transmission orders and the second diffraction event comprises the $-1^{st}$ reflection order in the Littrow condition, so that the third and fourth directions are respectively identical to the first and second directions and so that the incident light in the first diffraction event and the recombined light in the third diffraction event are superimposed and propagate radially.

3. The rotation sensor according claim 1, characterized in that wherein the incident beam is centered on the rotation axis before impinging on the coupling means, the cylindrical waves extending over the whole $2\pi$ angular width so as to form a light disk or light ring.

4. The rotation sensor according to claim 1, wherein the grating diffracting the light in transmission is the first grating and the grating diffracting the light in reflection is the second grating.

5. The rotation sensor according to claim 4, wherein the internal part is formed by a transparent disk in which the light incident on the first grating, in the first diffraction event, propagates.

6. The rotation sensor according to claim 4, wherein the coupling means are formed by a conical mirror centered on the rotation axis, the conical mirror defining substantially an angle of 45° with the rotation axis and the light source generating an incident beam propagating parallel to the rotation axis before impinging on the conical mirror, the recombined light propagating back to the conical mirror where it is reflected in the direction of the rotation axis and it is further deviating by a beam splitter in direction of the light detector.

7. The rotation sensor according to claim 4, wherein the coupling means are formed by a planar grating of circular lines and grooves centered on the rotation axis, the light source generating an incident beam propagating parallel to the rotation axis before impinging on the planar grating.

8. The rotation sensor according to claim 1, wherein the light detector is attached to one of the first and second gratings, the one grating having at least two portions diametrically opposed relative to the rotation axis and the other grating being a cylindrical grating extending over the whole $2\pi$ angular width, the light detector having at least two distinct segments arranged so as to receive recombined light respectively diffracted by the at least two diametrically opposed grating portions.

9. The rotation sensor according to claim 1, wherein the first and second gratings are both cylindrical gratings extending over the whole $2\pi$ angular width, the light detector having at least two distinct segments arranged so as to receive recombined light respectively diffracted by the first and second gratings in two zones diametrically opposed relative to the rotation axis.

10. The rotation sensor according to claim 9, wherein the light detector has a plurality of angular segments defining a plurality of pairs of opposite segments, each opposite segments pair receiving recombined light diffracted by the first and second gratings in two zones diametrically opposed relative to the rotation axis, two first diametrically opposed zones corresponding to any first pair of opposite segments of the light detector being angularly shifted relative to two second diametrically opposed zones corresponding to any other pair of opposite segments of the light detector.

11. The rotation sensor according to claim 10, wherein the number of the pairs of opposite segments is greater than three.

12. The rotation sensor according to claim 1 wherein the rotation sensor further comprises a third grating arranged at the first or second lateral surface with its grating lines parallel to the rotation axis, the third grating being phase-shifted relative to the other grating, among the first and second gratings, arranged at the same first or second lateral surface, the light detector having different segments for receiving recombined light diffracted by the third grating and recombined light diffracted by the other grating arranged at the same first or second lateral surface.

13. The rotation sensor according to claim 12, wherein the third grating and the other grating arranged at the same first or second lateral surface are arranged one above the other, the light detector having two adjacent annular regions for receiving recombined light respectively diffracted by the third grating and the other grating.

14. The rotation sensor according to claim 12, wherein the third grating and the other grating arranged at the same first or second lateral surface are respectively formed by two sets of grating segments at a same level, the grating segments of one set being interleaved between the grating segments of the other set, two diametrically opposed grating segments belonging to a same set among the two sets.

* * * * *